United States Patent [19]

Land

[11] 3,822,934
[45] July 9, 1974

[54] CASSETTE CHANGER FOR USE WITH A PHOTOGRAPHIC PROJECTOR ADAPTED TO RECEIVE A MULTI-PURPOSE FILM HANDLING CASSETTE

[75] Inventor: Edwin H. Land, Cambridge, Mass.

[73] Assignee: Polaroid Corporation, Cambridge, Mass.

[22] Filed: Dec. 26, 1972

[21] Appl. No.: 318,513

[52] U.S. Cl. .................................... 352/123, 352/6
[51] Int. Cl. ........................................... G03b 21/04
[58] Field of Search ................................ 352/123, 6

[56] References Cited
UNITED STATES PATENTS
3,480,354  11/1969  Fukuda .............................. 352/123
3,550,879  12/1970  Bundschuh ..................... 352/123 X

*Primary Examiner*—Monroe H. Hayes
*Attorney, Agent, or Firm*—John S. Vale

[57] ABSTRACT

A cassette changer is provided in the form of an accessory which may be attached to a projector/processor that is configured to receive multi-purpose (self-developing) film handling cassettes. The changer includes a magazine for holding a plurality of cassettes and mechanisms for automatically moving the cassettes, one at a time, between the magazine and an operative position within the projector/processor.

24 Claims, 7 Drawing Figures

CASSETTE CHANGER FOR USE WITH A PHOTOGRAPHIC PROJECTOR ADAPTED TO RECEIVE A MULTI-PURPOSE FILM HANDLING CASSETTE

BACKGROUND OF THE INVENTION

1. Field of the Invention

The present invention relates to the field of photography and, more specifically, to apparatus for automatically changing film handling cassettes in motion picture projectors.

2. Description of the Prior Art

The concept of a self-developing motion picture film has been embodied in a unique film handling system which includes a multipurpose film handling cassette and a special purpose projector/processor.

The cassette is provided with a photographic film strip coupled between supply and take-up reels and a normally inoperative processing station for applying a fluid processing composition to the film after exposure.

After the film strip has been exposed in a motion picture camera, the cassette may be immediately transferred to the projector/processor which preferably includes an opening in its top wall for inserting the cassette into a receiving chamber for film handling operations.

In response to fully inserting the cassette into the chamber, the projector/processor automatically 1) latches the cassettes in an operative position and activates the processing station; 2) engages the supply and take-up reels and rewinds the film past the processing station for the application of the processing fluid; 3) drives the film forward and projects the film; 4) rewinds the film; and 5) disengages the supply and take-up reels, unlatches the cassette and partially ejects it through the opening in the top wall of the projector. Provisions are also made for automatically eliminating the processing step when the cassette is subsequently inserted into the projector for film projection.

The present invention provides an accessory, in the form of an automatic cassette changer, for expanding the convenience of this unique film handling system. When attached to the projector/processor, the changer will successively insert and withdraw a plurality of cassettes to provide a more or less continuous showing of film.

The prior art discloses a number of projectors which include "built-in" cassette changers (see e.g., U.S. Pat. Nos. 3,480,354 and 3,561,853). However, these projectors are relatively expensive and are generally marketed to provide a deluxe version of a lower priced projector which does not include this feature. If a consumer initially purchases the non-changing model, and at a later date wishes to upgrade his system, his only recourse is to buy the more expensive projector because changers generally are not provided as an accessory which may be attached to his existing projector.

In a related field, namely, tape cassette players and recorders, an accessory cassette changer is disclosed in U.S. Pat. No. 3,289,962. This changer requires substantial modification of a standard tape cassette (by the addition of a pair of outwardly extending posts) before the changer will function properly. Furthermore, its method of inserting and withdrawing cassettes is totally unsuitable for use with a projector in which cassettes are automatically partially ejected through an opening in the top wall of a projector housing.

SUMMARY OF THE INVENTION

The present invention relates to a self-developing motion picture film handling system which has expanded capabilities to provide automatic cassette changing. More specifically, a cassette changer is provided in the form of an accessory which may be attached to a projector/processor and is designed to handle multi-purpose film handling cassettes without having to make any modifications to the cassette housing.

An important advantage of such a system is that it allows the consumer to add the automatic changing feature without having to invest in a new projector or having to replace his existing multi-purpose film handling cassettes.

The projector includes a box-like housing having a shallow rectangular depression in its top wall. The depression is formed by four vertically depending side walls and a horizontal bottom wall joined to bottom edges of the four side walls. Centrally located in the bottom wall of the depression is an elongated access slot through which a parallelepiped shaped multi-purpose cassette may be inserted into or withdrawn from the projector.

The slot communicates with an open ended parallelepiped receiving chamber which is preferably dimensioned to closely conform to the shape of the cassette housing to inhibit the passage of light between the walls of the cassette and receiving chamber. Extending into the chamber are a number of mechanisms which the cassette engages as it is inserted. These may include a projector actuating mechanism, an aperture plate and claw mechanism, and an air supply coupling for directing air into the cassette housing to facilitate film drying operations. As the cassette reaches its fully inserted position in the chamber, it displaces the actuating mechanism to initiate the sequence of operations outlined previously.

At the end of the operating cycle, an ejection mechanism raises the cassette through the slot such that the upper portion of the cassette housing extends into the shallow depression at the top of the projector housing.

In order to fully insert the cassette into the receiving chamber and locate its position for film handling operations, it is necessary to apply a positive downward force on the cassette housing to overcome resistance to movement into the chamber created by the various mechanisms which must be displaced by the cassette and also to overcome a certain amount of frictional resistance at the cassette and chamber wall interface.

In a preferred embodiment, the changer includes a housing which is adapted to be releasably secured to the top wall of the projector such that it is positioned over the shallow depression and the access slot. In order to accurately locate the changer housing in a predetermined relationship with the slot, the changer housing preferably includes a generally rectangular projection which closely conforms to the shape of the depression in the top wall of the projector. The projection fits into the depression in telescoping fashion thereby providing a means for aligning the changer and projector in operative association.

A magazine-type of structure is provided within the changer housing for supporting a plurality of cassettes in side-by-side relation. The magazine is oriented in a direction transverse to the long dimension of the slot.

The cassettes are moved relative to the slot by indexing means which serve to translate them from a pre-insertion storage area on one side of the slot, to an aligned position over the slot, and then to a post-ejection storage area on the opposite side of the slot.

A cassette located at the aligned position is adapted to be lowered through an opening in the changer housing and into the slot. A positive downward force is then adapted to be applied for fully inserting the cassette into the chamber and displacing the actuating mechanism. After partial ejection, the cassette is adapted to be raised into the changer housing and moved by the indexing means from the aligned position to the post-ejection storage area. As one cassette is moved to the post-ejection storage area, another cassette is moved into the aligned position and the cycle is adapted to be repeated.

Preferably, the means for lowering, applying a downward force, and raising the ejected cassette takes the form of a cassette carrier. In its preferred embodiment, the carrier is configured to engage a pair of ribs on the cassette which form part of a pre-existing light sealing arrangement to further prevent light from penetrating into the receiving chamber.

The cassette changer also includes control means for controlling the indexing and carrier means such that they may function in a coordinated manner with the operation of the projector.

Therefore, it is a primary object of the present invention to provide a self-developing film handling system which may be expanded to include automatic cassette changing by the addition of an accessory cassette changer to a projector/processor.

It is another objection of the invention to provide an automatic cassette changer adapted for use with a projector and existing multi-purpose film handling cassettes without having to modify the cassette structure.

Another object of the present invention is to provide a cassette changer for moving film handling cassettes into and out of a motion picture projector of the type including an opening in a top wall of the projector through which a cassette may be lowered and then positioned for film handling operations by the application of a downward force on the cassette.

It is a further object of this invention to provide a changer, for use with a projector of the type previously described, which includes a housing, means for supporting a plurality of film handling cassettes, indexing means, means for lowering a cassette into the projector and for applying a downward force thereto, and means for returning a cassette from the projector to the changer housing.

Another object of the present invention is to provide a motion picture projector which includes means for receiving and aligning an automatic cassette changer in operative relation therewith.

It is still another object of the present invention to provide a method for changing multi-purpose film handling cassettes in a projector of the type previously described.

Other objects of the invention will, in part, be obvious and will, in part, appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
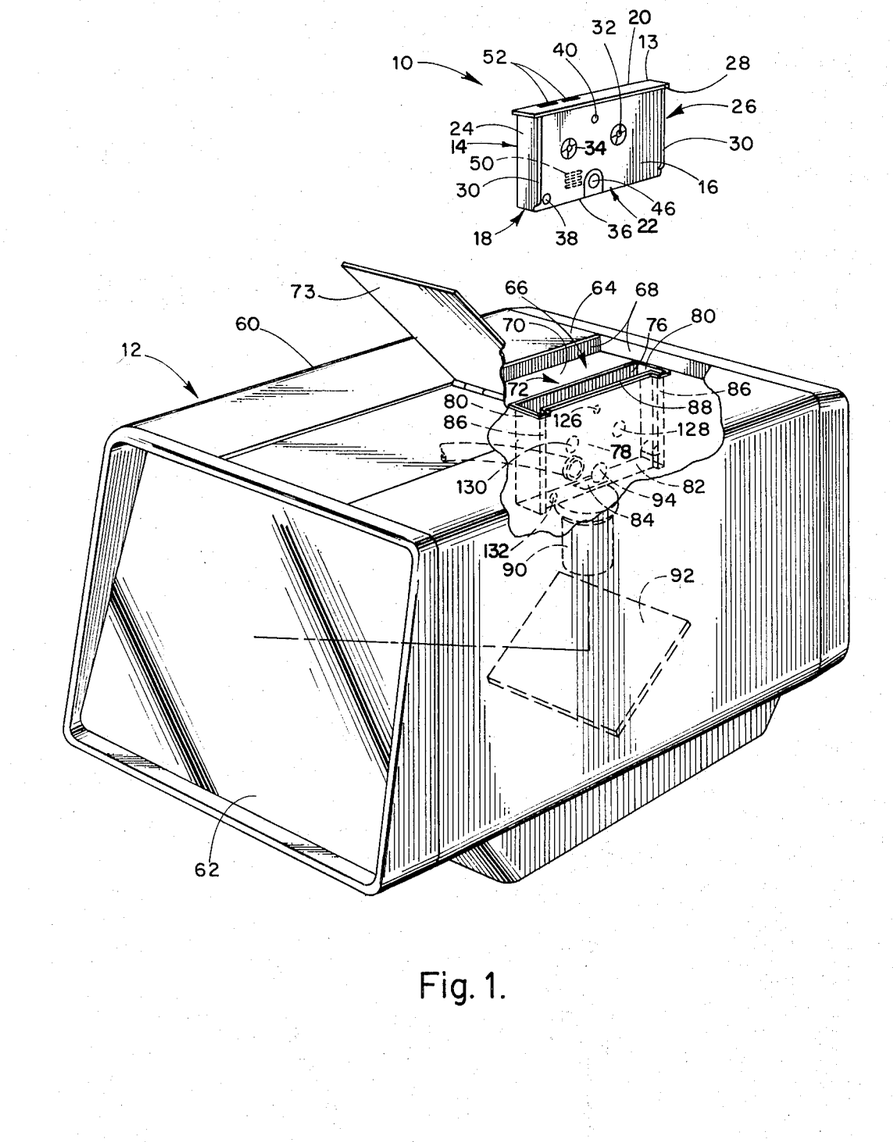
FIG. 1 is a perspective view of a projector embodying the instant invention and a multi-purpose film handling cassette.

A self-developing film handling cassette 10 and a projector/processor 12 for receiving cassette 10 are shown in FIG. 1 of the drawings.

Because cassette 10 is well known and does not, in itself, constitute any part of the present invention but rather is adapted to be manipulated by the projector and the accessory cassette changer, it will be described with less than full details about its interior construction and mechanisms.

The cassette includes a generally parallelepiped shaped housing 13 formed by a pair of rectangular side walls 14 and 16 and an intermediate peripheral wall 18 which serves to space side wall 14 and 16 in parallel relation to one another. To simplify the identification of peripheral wall 18, it will be referred to as including a top peripheral section 20, a bottom peripheral section 22, and a pair of end peripheral sections 24 and 26.

As shown in FIG. 1, top section 20 is dimensioned such that its four edges extend outwardly and slightly beyond the exterior surfaces of side walls 14 and 16 and end sections 24 and 26 to define a generally rectangular rib 28 which extends around the four sides of cassette housing 13. For the purposes of this disclosure, rib 28 will be considered to occupy a horizontal plane.

A pair of vertical ribs 30 are formed near the intersections of side wall 16 and end peripheral sections 24 and 26 are preferably disposed such that they extend outwardly from the exterior surface of side wall 16.

Rib 28 forms part of a light sealing system and ribs 30 serve to orient and guide cassette 10 into the projector 12. A more detailed description of these operations will appear later.

For the most part, the interior components of cassette 10 are mounted on the interior surface of side wall 14 and are accessible through a plurality of openings in the opposite side wall 16.

These components, while not shown, include a supply and take-up reel mounted in coplanar relation. Access to the hubs of the supply and take-up reel is provided by openings 32 and 34, respectively, in cassette side wall 16.

A photographic film strip of the type disclosed in U.S. Pat. Nos. 2,726,154 or 2,944,894 is coupled between the supply and take-up reels and generally follows a path around internal idlers or rollers positioned near corners of the cassette 12. In a preferred embodiment, the film path generally follows the peripheral wall 18 and travels from the supply reel along end peripheral section 26 to bottom peripheral section 22, and then along bottom section 22 towards end section 26. It will be noted that the bottom peripheral section 22 includes an opening 36 therein providing access to the film for exposure and projection operations. After the film passes opening 36, it passes around an idler (accessible through opening 38 in side wall 16) which may have its rotation selectively arrested by a mechanism in the projector 12 to provide snubbing action and then to the take-up reel.

After the film has been exposed in a suitable motion picture camera and the cassette has been transferred to projector 12, a normally inoperative processing station within cassette 10 is adapted to be activated to coat the exposed film strip with a fluid processing composition as the film is rewound from the take-up reel to the supply reel. The processing station is activated, in part, by a locating pin in the projector which is adapted to enter the cassette via an opening 40 in side wall 16.

A pair of electrical contacts (not shown) are located on the exterior surface of cassette side wall 14 near bottom peripheral section 22. These contacts form part of a circuit for sensing whether or not the film has been processed. A more detailed description of the processing station, the processing station activation mechanism, and the sensing circuit may be found in the copending applications Ser. No. 227,080, filed on Feb. 17, 1972 by E. H. Land; and Ser. No. 227,092, filed on the same date by J. F. Batter, et al; both of which are assigned to the same assignee as the present invention.

Light from the projection lamp in the projector is adapted to be directed through an opening 46 in side wall 16 into a prism which changes the direction of the light by approximately 90° and directs it through the film and opening 36 in bottom peripheral section 22. An example of such a prism may be found in the copending application Ser. No. 214,591 of P. G. Baker, filed on Jan. 3, 1972.

Cassette 10 is preferably adapted to have air blown through the housing during processing and projection operations to enhance film drying and to cool the prism. For this purpose an air inlet or opening 50 is provided in cassette side wall 14 and an air outlet or slot 52 is provided in top peripheral section 20. A more detailed disclosure of the air flow system may be found in the copending application of W. A. Holmes, et al, Ser. No. 214,638, filed on Jan. 3, 1972.

The projector 12 for processing and projecting the film strip in cassette 10 and for receiving an accessory cassette changer preferably includes a generally boxlike housing 60 formed, in part, by a rear projection screen 62.

Located in a top wall 64 of housing 60 is a generally rectangular shallow depression 66 formed by four depending side walls 68 and a bottom wall 70 joined to the bottom edges of depending side walls 68. Bottom wall 70 has an elongated access slot 72 therein through which cassette 10 may be inserted into and withdrawn from projector 12. In order to cover depression 66 and slot 72 when the projector 12 is not in use, a hinged door 73 may be provided as shown in FIG. 1.

Communicating with access slot 72 is a generally parallelepiped shaped chamber 74 for receiving and supporting cassette 10 in an operative position for film handling operations. Chamber 74 is formed by a pair of opposed side walls 76 and 78, a pair of opposed end walls 80, and a bottom wall 82 having an opening 84 therein which is adapted to be aligned with the opening 36 in the bottom peripheral section 22 of the cassette 10 when it is fully inserted in chamber 74.

As best shown in FIG. 1, side wall 78 includes a pair of vertically arranged channels or guide tracks 86 near its opposite ends for receiving the vertical guide ribs 30 formed on side wall 16 of the cassette housing. Initially, the ribs 30 and tracks 86 cooperate to insure that the cassette may only be inserted into chamber 74 when the side wall 16 of the cassette is positioned adjacent to the side wall 78 of the chamber 74. As the cassette is inserted into chamber 74, the mating ribs 30 and tracks 86 guide it downwardly into the chamber and thereafter provide a means for aligning and maintaining the cassette in a predetermined relationship with the end walls 80 of chamber 74.

As noted earlier, the top peripheral section 20 of cassette 10 is provided with an overhanging rib 28. This rib is adapted to rest atop an upstanding rib 88, integrally formed with the bottom wall 70 of depression 66 such that it surrounds the edges of slot 72 when the cassette 10 is fully inserted into chamber 74. The function of these two abutting ribs 28 and 88 is to provide a light sealing arrangement to inhibit the passage of light between the exterior cassette walls and the interior chamber walls.

As noted earlier, cassette 10 is adapted to be inserted into chamber 74 with bottom peripheral section 22 facing chamber bottom wall 82 and with side wall 16 of the cassette located adjacent to side wall 78 of the chamber.

Positioned below bottom chamber wall 82 and in alignment with opening 84 therein are projection means which include an aperture plate and claw mechanism (not shown) for engaging and transporting the film strip, a rotary shutter (not shown), and a projection lens 90. Positioned below lens 90 and disposed in an oblique plane with respect to the optic axes of the lens is a mirror 92 for reflecting light from the lens to the rear of projection screen 62. The light for projection is provided by a projection lamp (not shown) which is adapted to be mounted behind an opening 94 in the chamber side wall 78 which is disposed to be in alignment with the prism opening 46 when cassette 10 is fully inserted in chamber 74.

Figure 6:
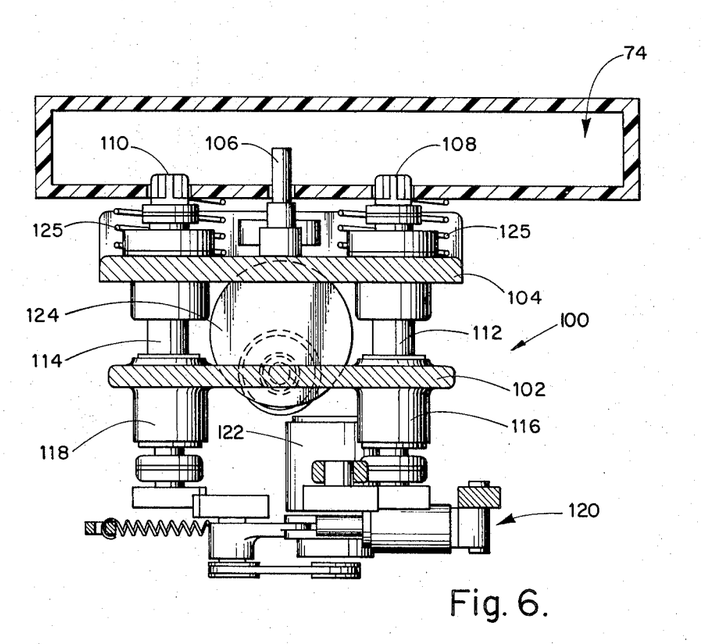
FIG. 6 is a top elevational view of a projector latching, reel drive, and cassette ejection mechanism.

Projector 12 is preferably provided with a cassette latching and reel drive mechanism 100 mounted adjacent to side wall 78 of chamber 74. One embodiment of such a mechanism 100 is shown in FIG. 6 to include a fixed support plate 102 and a movable support plate 104 mounted between support plate 102 and chamber side wall 78 for movement toward and away from chamber 74.

Mounted on the movable plate 104 facing chamber 74 is a fixed locating and latching pin 106, a pair of rotatably mounted reel drive spindles 108 and 110, and a snubbing mechanism (not shown).

The drive spindles 108 and 110 are coupled by extensible telescoping shafts 112 and 114, respectively, to a pair of spindle drive units 116 and 118 which are fixedly mounted on support plate 102. Also supported by plate 102 is a movable power transmission mechanism 120 which may be selectively coupled to either of the spindle drive units to apply power from a motor 122 thereto.

The movable support plate 104 is adapted to be driven towards and away from chamber side wall 78 by a motor driven off axis cam 124 and cooperating spindle biasing springs 125.

As best shown in FIG. 1 chamber side wall 78 includes appropriate openings 126, 128, 130, 132 to allow passage therethrough of pin 106, drive spindles 108 and 110, and the snubbing mechanism, respectively, when movable support plate 104 is driven towards chamber side wall 78.

Projector 12 is also preferably equipped with an air blowing system for providing a flow of air through the cassette housing 13 during processing and projection operations to enhance film drying and to cool the prism. An air blower (not shown) is coupled by an appropriate duct to an air coupling member 134 (see FIG. 5) mounted in side wall 76 of chamber 74.

Figure 5:
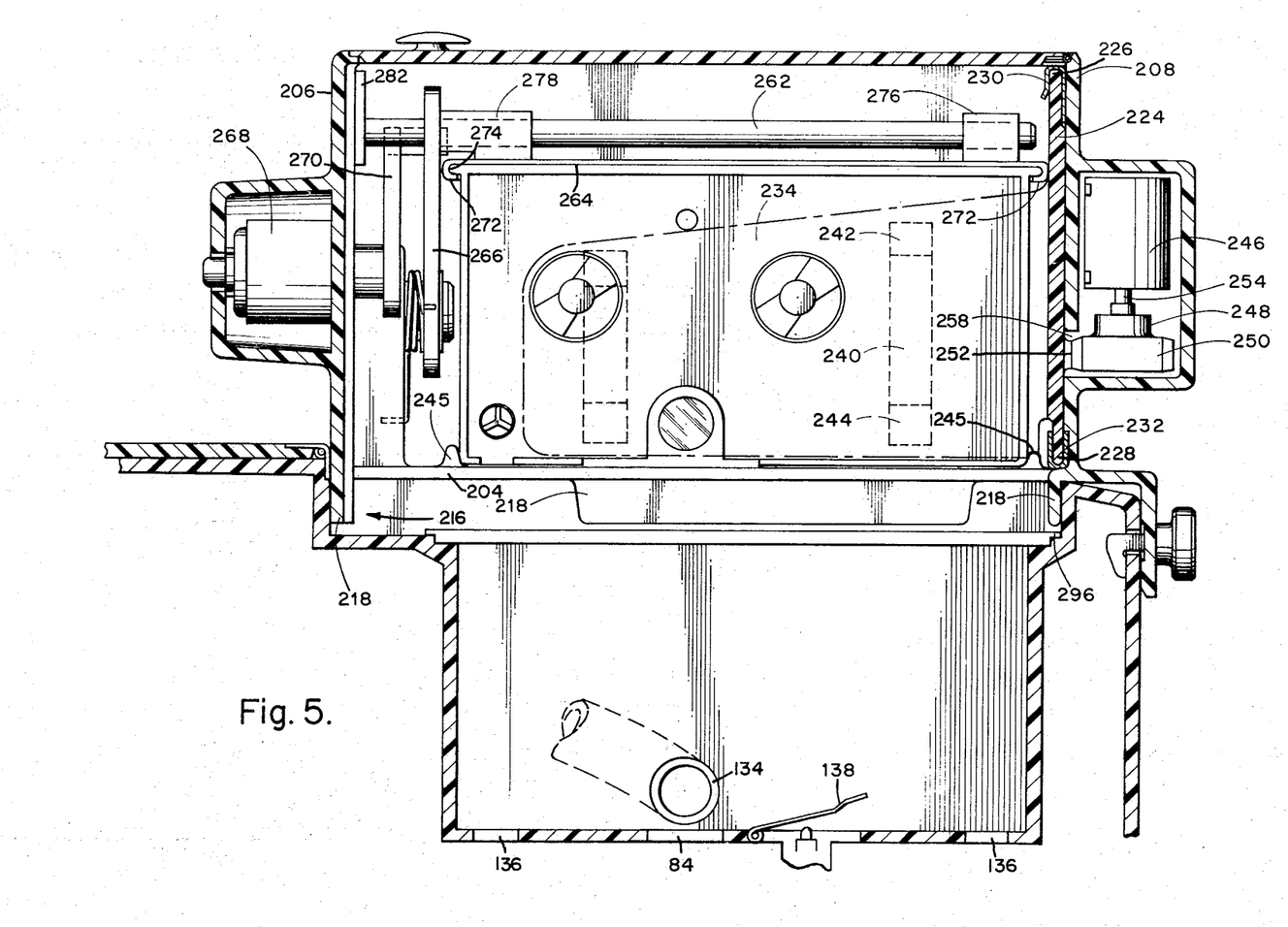
FIG. 5 is a side elevational view, partly in section, of the changer and projector of FIG. 2.

Preferably, coupling member 134 is spring biased towards wall 78 and extends into chamber 74 slightly such that it may be displaced towards side wall 76 as the cassette 10 is inserted into chamber 74. When the cassette is fully inserted into the chamber, coupling member 134 is adapted to be positioned over the air inlet 50 in side wall 14 of the cassette and held in abutment with side wall 14 by the biasing spring.

Another sub system of projector 12 is an ejection mechanism for partially extracting cassette 10 from chamber 74 through slot 72 such that the top portion of the cassette extends into depression 66. One type of ejection mechanism comprises a spring biased plate which is located over bottom wall 82 of chamber 74. As the cassette is inserted, the ejection plate is depressed downwardly toward bottom wall 82, against the bias of the springs, and is locked in its down position by a foot attached to movable plate 104 when this plate is moved to its operative position adjacent chamber side wall 78. When plate 104 is retracted, the foot releases the ejection plate and it elevates the cassette to its partially ejected position. A more detailed explanation of this spring biased ejection plate may be found in the co-pending application of E. H. Land, Ser. No. 227,093, filed on Feb. 17, 1972.

A preferred ejection mechanism may take the form of a pair of cams (not shown) which are positioned below bottom chamber wall 82 in alignment with a pair of openings 136 therein. After completion of film handling operations, these two cams are adapted to be pivoted into the chamber through openings 136 for engaging the opposite ends of cassette bottom peripheral section 22 and elevating the cassette through slot 72 to its partially ejected position.

Control over the sequence of operation of the various subsystems and components within projection 12 is accomplished by an electronic logic circuit. In a preferred embodiment, actuation of the electronic logic circuit is accomplished in response to the cassette being fully inserted into chamber 74. For this purpose, a normally open switch 138 is in FIG. 5 positioned near the bottom of chamber 74 so as to be engaged and rendered closed by the bottom peripheral section 22 of cassette 10 as it approaches its operative position.

The closing of switch 138 and the actuation of the control circuit causes the motor driving cam 124 to be energized, thereby driving movable plate 104 towards chamber side wall 78. Pin 106 enters cassette opening 40 and serves; 1) to locate the cassette 10 at its final operative position in chamber 74 such that the drive spindles 108 and 110 following pin 106 may be accurately located and engage the hubs of the supply and take-up reel through openings 128 and 130 in cassette side wall 16; 2) to latch cassette 10 in its final operative position; and 3) to activate the normally inoperative processing station within the cassette.

In another embodiment, a pin similar to pin 106 may be inserted mechanically into the cassette opening 40 in response to the cassette engaging and displacing a lever at the bottom of chamber 74. In this embodiment, the pin closes a switch, when it is fully inserted, to actuate the electronic logic circuit.

After plate 104 has been moved into its operative position, the control circuit controls a sequence of operations in which the air supply is turned on, the supply reel drive is energized, and the exposed film is rewound from the take-up reel, past the cassette processing station where an applicator apples a thin layer of fluid processing composition to the exposed photosensitive emulsion side of the film strip, and onto the supply reel.

Development of the latent images in the film strip is accomplished very rapidly such that the film may be driven forwardly for projection almost immediately after the rewind operation.

At this point the control circuit turns on the projection lamp, energizes the take-up reel drive, and actuates the claw mechanism for transporting the film in incremental sections past the cassette opening 36 for projection. During the projection cycle, the snubbing mechanism extending through opening 38 in cassette housing 13 selectively arrests the rotation of the idler to isolate that portion of the film strip being projected from the tension induced into the film strip by the rotating take-up reel.

After projection, the supply reel drive is energized by the control circuit and the film strip is rewound onto supply reel.

The circuit then energizes the motor driving cam 124 and support plate 104 is moved away from side wall 78 of the chamber under the influence of springs 125 to disengage locating and latching pin 106 and reel drive spindles 108 and 110 for the cassette.

In response to retracting plate 104, the ejection mechanism is actuated and it elevates the cassette to its partially ejected position. At this point, the control circuit turns off the projector.

As noted earlier, cassette 10 includes a pair of electrical contacts (not shown) on side wall 16. These contacts are adapted to engage another set of contacts (not shown) in chamber 74 when cassette 10 is fully inserted therein for connecting the cassette contacts into the control circuit. Prior to processing operations, the cassette contacts are shorted together such that when they are coupled to the control circuit, a signal is produced which indicates to the control circuit that the processing mode of operation should precede the projection operation.

After the film has been processed, the cassette contacts are open circuited and when the cassette is subsequently inserted into the projector, the processing signal is not produced and the control circuit automatically proceeds to initiate the projection mode of operation.

The preceding is a brief general description of a multi-purpose cassette 10, and a projector 12. A more detailed description of both of these components, along with several alternative embodiments of each may be found in the following copending applications: Ser. No. 227,093, filed by E. H. Land on Feb. 17, 1972, Ser. No. 227,080, filed by E. H. Land on Feb. 17, 1972, and Ser. No. 227,092, filed by J. F. Batter, et al, Feb. 17, 1972, all of which are assigned to the same assignee as the present invention.

An accessory cassette changer 200 which is adapted to be releasably secured to projector 12 for automatically inserting and withdrawing a succession of film handling cassettes into and out of chamber 74 is shown in FIGS. 2–5.

Figure 2:
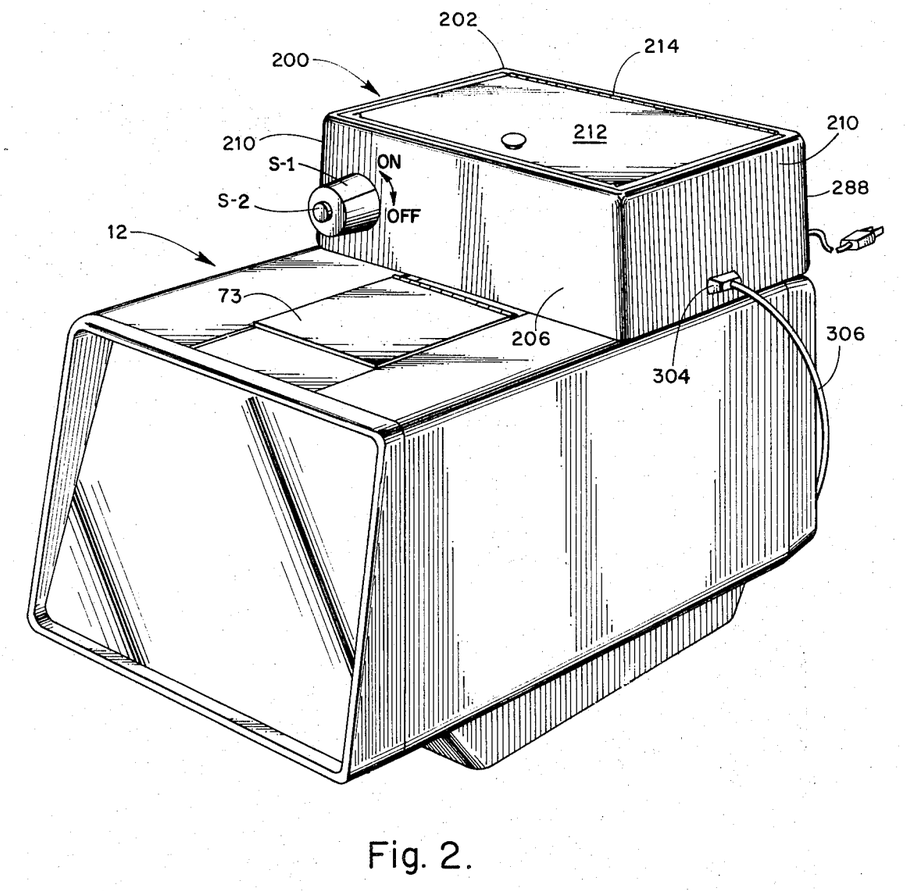
FIG. 2 is a perspective view of an automatic cassette changer embodying the instant invention operatively positioned on the projector of FIG. 1.

The changer includes a generally parallelepiped shaped housing 202 which rests atop top wall 64 of projector housing 60 in overlying relation to the shallow rectangular depression 66 and the elongated access slot 72.

Housing 202 may be formed of any suitable material such as metal or plastic and includes a main housing section formed by a bottom wall 204, forward and rear side walls 206 and 208, a pair of end walls 210. Access to the interior of the main housing section is provided by opening a top cover plate 212 which may be conveniently hinged to the top edge of rear side wall 208 at hinge 214.

Figure 4:
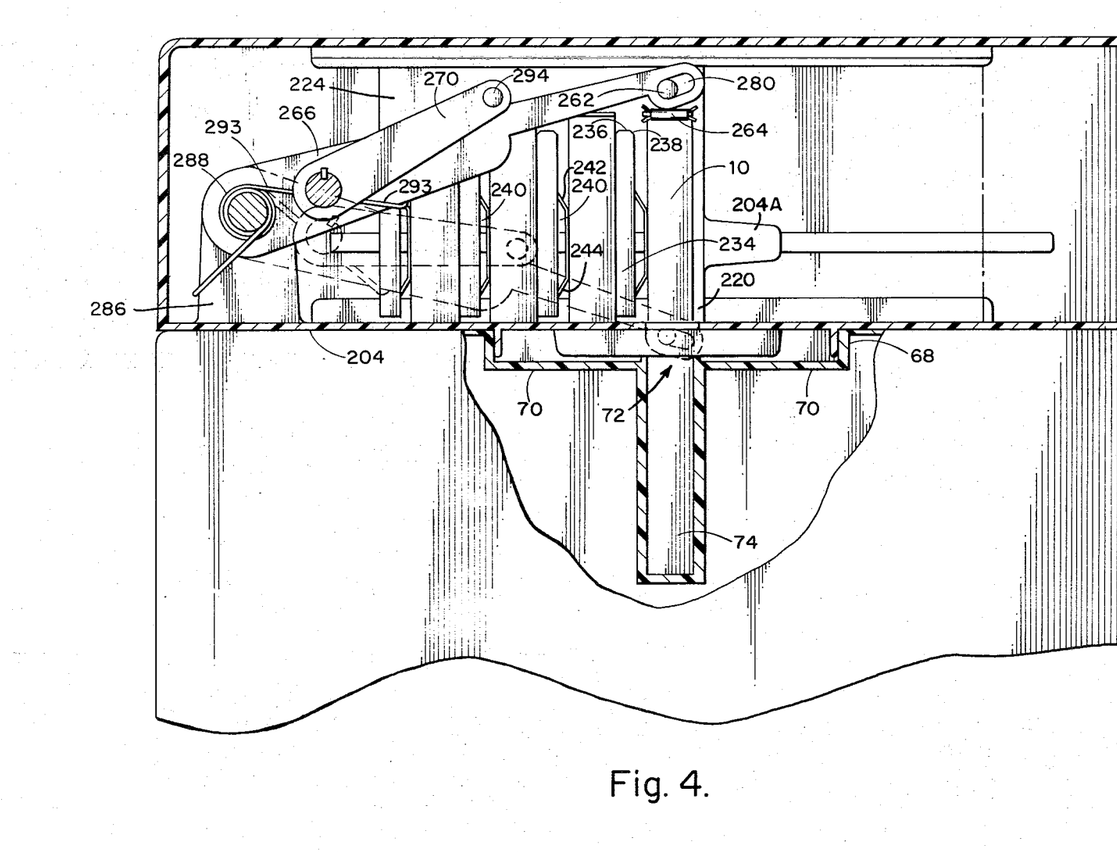
FIG. 4 is a front elevational view, partly in section, of the changer and a portion of the projector of FIG. 2.

In order to accurately align changer 200 with the elongated projector access slot 72, a generally rectangular projection 216 may be provided so as to depend from the bottom wall 204 of the changer and fit into the shallow depression 66 in telescoping fashion. As best shown in FIGS. 4 and 5, projection 216 may be formed by four elongated flanges 218 which may be arranged to form sections of a rectangular frame that is dimensioned to closely conform to the dimensions of the opening defined by the four side walls 68 of depression 66. The depth of flanges 218 are preferably less than the depth of side walls 68 such that changer 200 is supported by those portions of changer bottom wall 204 on either side of projection 216 which bear against the top wall 64 of projector 12 rather than by the flanges 218 bearing against the bottom wall 70 of the depression 66.

With changer 200 accurately positioned on projector 12, a generally elongated rectangular opening 220 in changer bottom wall 204 (see FIG. 4) is aligned with the elongated access slot 72 in the bottom wall 70 of depression 66. For reasons to be explained later, opening 220 is slightly larger than slot 72.

Figure 3:
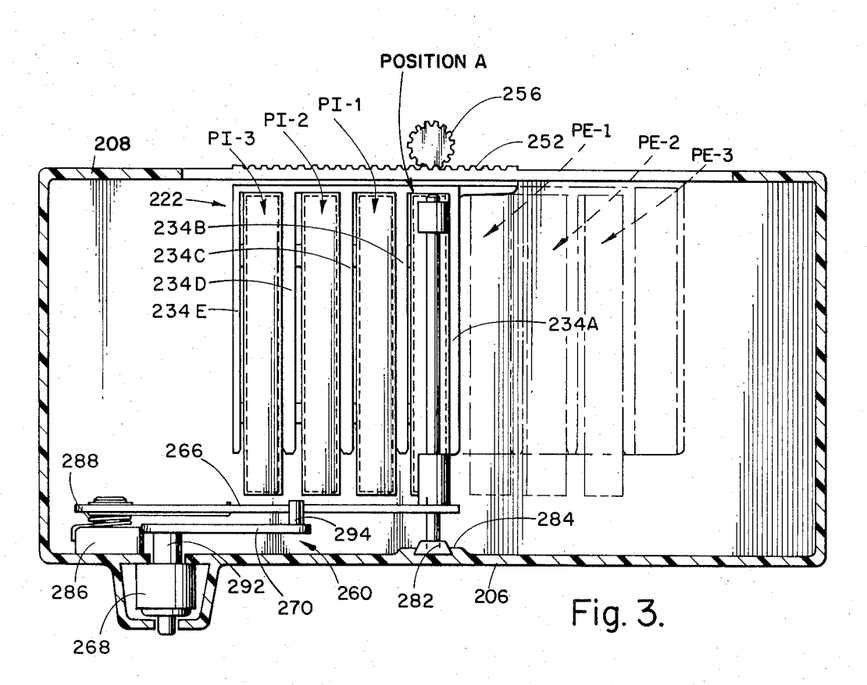
FIG. 3 is a top elevational view, partly in section, of the changer shown in FIG. 2.

As best shown in FIG. 3, a top view looking down into the main changer housing with top cover 212 removed, the cassettes 10 are adapted to be arranged in side-by-side relation within the main changer housing. Each of the cassettes 10 is inserted therein such that its bottom peripheral section 22 faces the bottom wall 204 of the changer and its end peripheral sections 24 and 26 face changer side walls 206 and 208, respectively.

The cassettes are initially loaded into the left hand section (as viewed in FIG. 3) of the main changer housing and are adapted to be moved to the right, i.e., in a direction transverse to the long dimension of opening 220 and slot 72.

The left hand section of the main changer housing may be considered to be a pre-insertion storage area having a plurality of pre-insertion storage positions PI-1, PI-2, PI-3, PI-4, etc.

A cassette located at position PI-1 is adapted to be moved one position to the right which may be designated as an aligned position A in which the cassette is aligned over opening 220 and slot 72.

From the aligned position A, the cassette may be lowered into chamber 74 through slot 72 and fully inserted therein by the application of a down force on the cassette. After film handling operations and partial ejection, the cassette is adapted to be raised into the main housing section of the changer 200 to once again assume the aligned position A. From position A, the cassette is adapted to be moved to the right to a post-ejection storage area which includes a plurality of post-ejection positions PE-1, PE-2, PE-3, PE-4, etc., (shown in dotted lines in FIG. 3).

As one cassette 10 is moved from position A to position PE-1, the next cassette in the row behind it is moved from position PI-1 into position A and the rest of the cassettes in the pre-insertion storage area all advance one position to the right.

The means for moving or indexing the row of cassettes 10 within the main changer housing includes a conveyor member 222.

In a preferred embodiment, member 222 includes a thin generally rectangular plate 224 which is adapted to be positioned adjacent rear changer side wall 208 and mounted for movement parallel thereto.

As best shown in FIGS. 3 and 4, the top and bottom edges 226 and 228 of plate 224 may be held in a pair of elongated generally U-shaped guide tracks 230 and 232 secured to rear side wall 208. The guide tracks 230 and 232 extend between the pre-insertion and post-ejection storage area and serve to guide plate 224 such that it may move parallel to changer rear wall 208. Preferably, plate 224 includes rollers (not shown) mounted along its top and bottom edges which engage the tracks 230 and 232 to reduce friction between the tracks and the plate 224.

The length of plate 224 preferably approximates the length of the pre-insertion or post-ejection storage areas which are substantially the same.

Fixedly secured to plate 224 and extending outwardly therefrom towards changer housing front wall 206 in a direction substantially normal to plate 224 are a plurality of elongated divider plates 234 A, B, C, D, E, etc., which serve to space the cassettes 10 from one another and also to apply a force to the cassettes to move them laterally within the changer housing when plate 224 is moved along rear wall 208.

As best shown in FIG. 5, the dividers 234 extend outwardly from wall 208 approximately three quarters of a cassette length and are dimensioned in the vertical direction to be shorter than the height of the cassette.

As best shown in FIG. 4, the top edge 236 of each plate 234 is beveled at 238 to facilitate insertion of a cassette between two adjacent dividers. It will be noted that dividers 234 B, C, D, and E include one or more vertically disposed spring biased ribs 240 on one side thereof for holding a cassette against the back side of the divider in front of it (to the right as viewed in FIGS. 3 and 4). Ribs 240 are spring biased outwardly from their respective dividers and also include top and bottom beveled edges 242 and 244 to facilitate vertical movement of a cassette between two adjacent dividers 234. Thus, the ribs 240 serve as a means for accurately positioning each of the cassettes in the conveyor member 222 by holding the side wall 16 of the cassette against the planar surface of a divider 234 ahead of it.

The cassettes may be accurately located with respect to the long dimension of the opening 220 in the bottom wall 204 of the changer by means of upstanding ribs 245 formed on bottom wall 204 such that they engage the bottom edge of cassette peripheral end sections 24 and 26.

The conveyor 222 is adapted to be moved along the guide tracks 230 and 232 by an indexing mechanism (see FIG. 5) formed by a D.C. motor 246, one way clutch 248, an indexing gear assembly 250 mounted on the changer rear side wall 208, and a toothed rack 252 formed horizontally on the apposite of conveyor plate 224 from the dividers 234.

Motor 246 is coupled by a shaft 254 to the one way clutch 248 which is in turn coupled to the indexing gear assembly 250. Gear assembly 250 includes a gear 256 which extends through an opening 258 in changer wall 208 and meshes with the toothed rack on plate 224. The one way clutch 246 is configured to allow the motor 246 to drive gear 256 in a counterclockwise direction (as viewed in FIG. 3) such that the conveyor 220 may be driven from the pre-insertion storage area past the aligned position A to the post-ejection storage area. The one way feature of clutch 248 permits the conveyor 222 to be returned to the pre-insertion storage area manually.

In a preferred embodiment, the indexing gear assembly 250 causes the conveyor 222 to index to the left (as viewed in FIG. 3) one position (or the distance between the center lines of two adjacent dividers 234) for every one revolution of motor 246.

As noted earlier, a cassette located at the alignment position A is adapted to be moved from the changer housing 202 into the projector receiving chamber 74 by lowering it through opening 220 in the bottom wall 204 of the changer and then through the access slot 72 in the bottom wall 70 of projection depression 66. As the cassette is inserted into chamber 74, it encounters a certain degree of resistance to downward movement caused by the frictional forces at the cassette/chamber interface, the inwardly biased air coupling member 134, and the contacts of the actuation switch 138 or other type of actuating mechanisms. Accordingly, it is necessary to apply a downward force on the cassette 10 to overcome this resistance and seat the cassette in its fully inserted position for film handling operations.

A cassette carrier mechanism for manipulating the cassette between the changer 200 and the projector 12 is shown generally at 260 in FIGS. 3–5.

Carrier 260 includes; a support arm or shaft 262, positioned over the aligned position A, having a support member 264 coupled thereto for receiving a cassette 10 from the pre-insertion position PI-1; a pivotally mounted and upwardly spring biased linkage arm 266 for lowering and raising arm 262, a drive assembly including a D. C. motor 268 and a drive arm 270 for driving the upwardly biased linkage arm 266 downwardly towards the bottom wall 204 of changer 200.

In a preferred embodiment, support member 264 is formed of a thin metal strip, e.g., 0.020 inch stainless steel, and includes a pair of underturned flanges 272 at its opposite ends which define openings 274 therebetween for receiving the portions of cassette rib 28 which overhang a cassette end peripheral sections 24 and 26. When support member 264 is in its fully raised position, the openings 274 are adapted to be aligned with rib 28 of the cassette at PI-1. As the cassette at PI-1 is moved toward the right (as viewed in FIG. 3), rib 28 enters openings 274 and the cassette may slide into support member 264 and be supported over opening 220 in position A. Further movement to the right allows the cassette to slide through the support member 264 and move into the first post-ejection storage position PE-1. It will be noted that support member 264 is slightly wider than the opening 220 in the bottom of the changer such that a cassette's upper end is engaged and supported by member 264 before its lower end reaches opening 220. As best shown in FIG. 4, the underturned flanges 274 may be flared at their lateral ends to facilitate insertion and withdrawal of cassette rib 28.

Support member 264 may be coupled to support shaft 262 by means of any suitable coupling arrangement such as the couplings 276 and 278 shown in FIG. 5.

Shaft 262 is adapted to pass through an elongated opening 280 near one end of drive linkage arm 266 and its end 282 is adapted to be captured in a vertically oriented guide track 284 mounted on the interior of changer forward wall 206. Track 284 is aligned with the longitudinal center line of changer opening 220 and projector slot 72 and serves to guide the shaft 262 as it is raised and lowered by linkage arm 266. The coupling arrangement between the end 282 of shaft 262 and track 284 may take the form of the dovetail structure shown in FIG. 3 or any other structure which permits the free movement of shaft 262 up and down the track 284 while permitting shaft 262 to remain substantially parallel to changer bottom wall 204.

Drive linkage arm 266 is preferably positioned in parallel adjacent relationship to interior surface of changer forward wall 206 and is pivotally coupled thereto at bearing 286.

Linkage arm 266 is mounted for pivotal motion between a fully raised position (shown in solid lines in FIG. 4) wherein it supports member 264 in position to allow cassette movement to the right and a fully lowered position (shown in dotted lines in FIG. 4) wherein a cassette supported by member 264 is fully inserted in chamber 74 and may be engaged by the projector locating and latching pin 106.

As best shown in FIGS. 3 and 4, a spring 288, coupled between linkage arm 266 and bearing 286 is provided to bias linkage arm 266 towards its fully raised position. An adjustable stop may be provided at the top end of guide track 284 for limiting the upward travel of shaft 264 to accurately locate the fully raised position of member 264.

Linkage arm 266 is adapted to be pivoted downwardly (clockwise as viewed in FIG. 4) against the bias of spring 288 by the motor driven arm 270. Arm 270 is coupled to the shaft 292 of motor 268 at one end and includes an offset pin 294 near its opposite end for engaging an intermediate portion of linkage arm 266.

When motor 268 is energized, motor shaft 292 pivots arm 270 in a clockwise direction (as viewed in FIG. 4) and arm 270 in turn pivots linkage arm 266 downwardly to lower a cassette held by member 264 through opening 220 and slot 72 and to apply a downward force to the cassette such that it may assume its fully inserted position and be latched by pin 106.

Once the cassette is latched, motor 268 may be de-energized. In the de-energized state, the motor shaft 292 is free to turn in a counterclockwise direction to permit linkage arm 266 to return to its fully raised position under the influence of spring 288 once pin 106 has been withdrawn from the cassette and projector ejection mechanism has partially ejected it.

In a preferred embodiment, that portion 293 of spring 288 coupled to linkage arm 266 is adapted to be captured by a detent (not shown) when arm 266 reaches its down position such that the spring 288 does not exert its upward biasing force until the arm 266 has been raised slightly by the partially ejected cassette.

The above described conveyor and carrier mechanisms are but one of many ways for moving a plurality of cassettes between the changer 200 and projector 12. One might design a simple gravity feed mechanism for partially inserting the cassette 10 into chamber 74 and a separate mechanism operating in conjunction with the gravity feed system for applying a downward force to the partially inserted cassette and thereafter for engaging and returning the partially ejected cassette to the changer housing.

The cassette changer 200 shown in FIGS. 2-5 operates as follows. The conveyor 222 is positioned in the left hand storage area and a plurality of cassettes are loaded in the conveyor with the bottom peripheral sections 22 of each of the cassettes facing bottom wall 204 of the changer housing and the side walls 16 of the cassettes facing the aligned position A. Thus bottom wall 204 provides means for supporting the cassettes within changer 200. During loading, the first cassette in the row occupies pre-insertion position PF-1. As best shown in FIG. 4, conveyor plate 204 may include an extension 204A to maintain the indexing gear 256 in engagement with rack 252.

The conveyor 222 is then manually moved one position to the right such that the first cassette 10 is engaged and supported by support member 264 at position A.

The D.C. motor 268 is energized causing the linkage arm 266 to rotate in a clockwise direction as viewed in FIG. 4 thereby inserting the cassette into chamber 74 and causing it to actuate projector switch 138. Actuation of switch 138 results in the movement of projector plate 204 into its operative position thereby latching the cassette and commencing film handling operations. At this point D.C. motor 268 is deenergized and linkage arm 266 is held in its down position by the captured spring portion 293.

After the completion of film handling operations, the cassette is partially ejected and spring 288 returns linkage arm 266 to its fully raised position thereby returning the cassette to position A. At this point, the indexing motor 246 is energized and is driven through one revolution causing the conveyor 222 to index one position to the right (as viewed in FIG. 3). This moves the first cassette from position A to post-ejection position PE-1 and moves the second cassette in the row from PI-1 to position A. The entire cycle is then repeated.

After the last cassette in the row has been returned to position A, the changer 200 automatically turns off and the conveyor 222 may be manually returned to the pre-insertion storage area to unload the cassettes from the conveyor.

Figure 7:
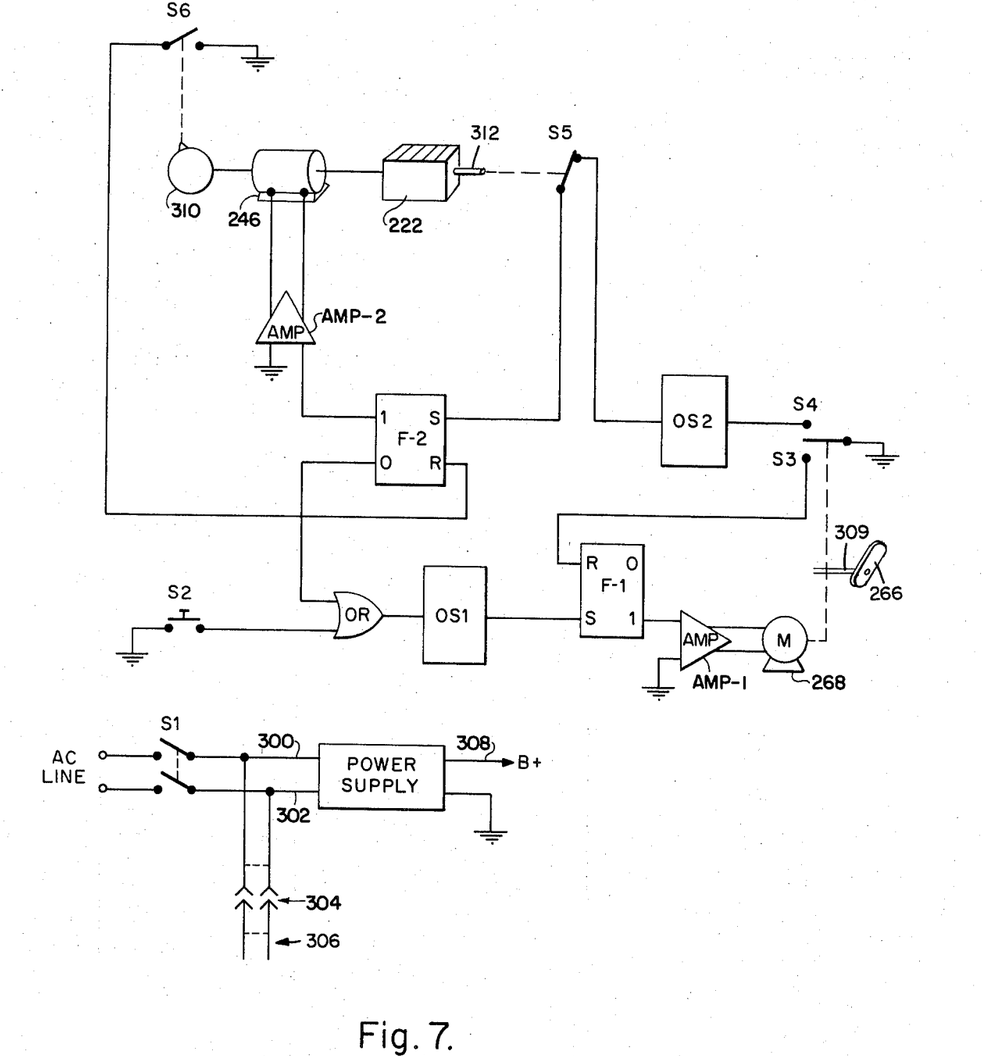
FIG. 7 is a diagrammatic illustration of an electro-mechanical control system for coordinating the operation of the changer with that of the projector.

A somewhat simplified electro-mechanical system for controlling and coordinating the operation of changer 200 with the operation of projector 12 is diagrammatically illustrated in FIG. 7.

The system includes a regulated D.C. power supply P.S. mounted in changer housing 202 for supplying a D.C. voltage B+. The power supply P.S. is adapted to be connected to an A.C. line through lines 300 and 302 and an on/off switch S-1. To eliminate having to run both the changer and projector line cords to a wall outlet, the changer may be provided with an A.C. receptical 304 connected in parallel with lines 300 and 302 for receiving the projector line cord 306 (see FIGS. 2 and 7).

The D.C. voltage output B+ is provided at line 308 which is coupled to the control circuit elements in a well known manner.

The electronic logic components of the control system are well known in the art and include an OR gate; one-shot multivibrators OS-1 and OS-2; D.C. amplifiers AMP-1 and AMP-2 and flip-flop circuits FF1 and FF2. The flip-flops FF1 and FF2 are preferably the standard set/reset type having two input terminals S and R and two corresponding output terminals 1 and 0 respectively.

The control system is actuable by closing a normally open switch S-2 which is connected to the input of the OR gate. The output of the OR gate serves as the input for the one-shot multivibrator OS-1 which provides a positive pulse, in response to closing S-2, to the input S of FF1 thereby setting FF1 and providing an output at terminal 1 which energizes the D.C. motor 268 through DC amplifier AMP-1.

Motor 268 drives linkage arm 266 to its down position which causes a lever 309 on arm 266 to close a normally open limit switch S-3 connected to the reset input R of FF-1. This resets FF-1 and de-energizes motor 268.

After the completion of film handling operations, the return of linkage arm 266 to its raised position causes the lever to close a normally open limit switch S-4 thereby actuating the second one-shot multivibrator OS-2. The output of OS-2 is fed through a normally closed switch S-5 to the input terminal S of FF-2. FF-2 is set and energizes the indexing motor 246 through the second DC amplifier AMP-2.

D.C. motor 246 is driven through one revolution to cause all of the cassettes to be laterally displaced one position. At the end of the one revolution, a cam 310 driven by motor 246 closes a normally open switch S-6 and resets FF-2 to de-energize the indexing motor 246. The resetting of FF-2 produces an output signal at terminal 0 of FF-2 which is fed through the OR gate to OS-1 to automatically initiate the change and indexing cycle once again.

When the conveyor 222 has been moved far enough to the right to position the last cassette in the row at position A, a lever 312 mounted on the conveyor engages and opens the normally closed switch S-5 to render FF-2 inoperative to cause the indexing motor 246 to be energized and FF-2 remains in the reset condition. It will be noted that the pulse from OS-2 is of short duration such that there is no input signal to terminal S of FF-2 when the conveyor is manually returned and switch S-5 is once again closed. After the conveyor is returned to its starting position, the control system may once again be actuated by closing S-2.

One skilled in the art will appreciate that the control system as shown may be expanded by changing certain components and adding others to provide other functions such as causing the conveyor to move forward or backward upon the introduction of a signal such that the order of introduction of cassettes into the projector may be other than sequential. Also, provisions may be made to override the indexing function such that the same cassette may be projected a second time, or for that matter a third time before it is changed.

In summary, a unique self-developing film handling system has been provided which features a projector/processor that is adapted to receive and accurately align a accessory film cassette changer in position on the projector such that a succession of film handling cassettes may be automatically inserted into and withdrawn from the projector.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A cassette changer for moving film handling cassettes into and out of a motion picture projector of the type including an opening through which a cassette may be lowered and positioned for film handling operations by the application of a downward force on the cassette, said changer comprising:
   a changer housing aadapted to be releasably secured to the projector in a predetermined relationship with the projector opening;
   means within said changer housing for supporting a plurality of film handling cassettes;
   indexing means mounted within said changer housing for moving and selectively presenting each of the plurality of cassettes at a position wherein it is aligned over the projector opening;
   means mounted within said changer housing for lowering a cassette from the aligned position into the opening and for applying a downward force on the cassette to position the cassette for film handling operations; and
   means mounted within said changer housing for returning a cassette to said changer housing after film handling operations.

2. A cassette changer as defined in claim 1 wherein said indexing means includes means for moving a cassette relative to said changer housing from a pre-insertion position located to one side of the projector opening to the aligned position over the projector opening.

3. A cassette changer as defined in claim 1 wherein said means for returning a cassette to said changer housing after film handling operations includes means for returning the cassette to the aligned position over the projector opening.

4. A cassette changer as defined in claim 3 wherein said indexing means further includes means for moving a cassette returned to the aligned position after film handling operation to a storage position located to one side of the projector opening.

5. A cassette changer as defined in claim 1 wherein said indexing means includes means for moving a cassette from a first storage position, located to one side of the projector opening, to the aligned position over the projector opening, and then to a second storage position located to the opposite side of the projector opening.

6. A cassette changer as defined in claim 5 wherein said indexing means further includes means for simultaneously moving one cassette from the aligned position to said second storage position while moving another cassette from said first storage position to the aligned position.

7. A cassette changer as defined in claim 1 wherein said support means includes means for supporting the plurality of cassettes in side-by-side relation and said indexing means includes means for moving all of the plurality of the cassettes simultaneously relative to the projector opening to present one of the cassettes at the aligned position.

8. A cassette changer as defined in claim 1 wherein said means for lowering a cassette into the opening and for applying a downward force thereto also serves as said means for returning a cassette to said changer housing.

9. A cassette changer as defined in claim 8 further including control means for coordinating the operation of said last mentioned means and said indexing means with the operation of the projector.

10. A cassette changer as defined in claim 1 wherein the projector includes a top wall and means defining a shallow rectangular depression in the top wall and the projector opening is located in a bottom wall of the depression and said changer housing includes means cooperating with the means defining the depression for accurately locating said changer housing in said predetermined relationship with the projector opening.

11. A cassette changer as defined in claim 10 wherein said changer housing includes a rectangular projection which is configured to be inserted into the rectangular depression in telescoping fashion to locate said changer housing in said predetermined relationship with the projector opening.

12. A cassette changer as defined in claim 1 wherein a film handling cassette includes a cassette housing having a peripheral wall which includes an integrally formed rib and said changer includes means for engaging the rib to move the cassette into and out of the projector.

13. A cassette changer as defined in claim 1 wherein the projector includes means for latching a cassette in position for film handling operations and means for partially ejecting a cassette through the projector opening after film handling operations and said means for returning a cassette to said changer housing is adapted to operate after the cassette is unlatched and partially ejected from the projector.

14. A cassette changer for sequentially moving a plurality of film handling cassettes into and out of a motion picture projector of the type including an elongated slot in the bottom wall of a shallow rectangular depression formed in a top wall of the projector and through which a cassette may be lowered and inserted into the projector for film handling operation by the application of a downward force on the cassette, such a projector also including ejection means for partially ejecting the cassette through the elongated slot after film handling operations, said changer comprising:

a changer housing adapted to be releasably secured to the projector in a predetermined relationship with the elongated projector slot;

means within said changer housing for supporting a plurality of film handling cassettes;

indexing means mounted within said changer housing for moving the cassettes relative to the projecting slot such that each of the plurality of cassettes is sequentially presented at a position wherein it is aligned over the projector slot; and carrier means mounted within said changer housing for lowering a cassette from the aligned position into the projector slot and for applying a downward force on the cassette to insert it into the projector for film handling operations and thereafter for raising the partially ejected cassette to the aligned position such that it may be moved by said indexing means.

15. A cassette changer as defined in claim 14 wherein said changer housing includes a bottom wall having an opening therein through which cassettes may be moved by said carrier means and said changer housing further includes alignment means depending from said bottom wall, said alignment means including projection means adapted to extend into the telescoping depression in the top wall of the projector in telescoping fashion to accurately position said opening in said bottom wall of said changer housing in alignment over the projector slot.

16. A cassette changer as defined in claim 15 wherein a film handling cassette includes an elongated parallelepiped shaped cassette housing including a peripheral wall having an opening therein for providing access to a film strip within the cassette housing for film handling operations and said support means and said indexing means of said changer are configured such that cassettes may be supported in side-by-side relation within said changer housing with each cassette opening facing said bottom wall of said changer housing and each cassette housing disposed substantially parallel to said opening in said bottom wall of said changer housing and the elongated slot in the projector such that said indexing means may move each of the cassettes in a direction transverse to a long dimension of the projector slot to sequentially present each of the cassettes at an aligned position over said changer opening and the projector slot.

17. A cassette changer as defined in claim 14 wherein said indexing means includes conveyor means for moving cassettes supported by said support means and drive means for driving said conveyor means.

18. A cassette changer as defined in claim 14 wherein a film handling cassette includes a housing having an integrally formed rib thereon and said carrier means includes carrier support means for engaging the rib to operatively couple a cassette to said carrier means.

19. A cassette changer as defined in claim 18 wherein said carrier means includes means for lowering and raising said carrier support means to move a cassette engaged by said carrier support means between said changer housing and the projector.

20. A cassette changer as defined in claim 19 wherein said carrier means includes drive means for moving said carrier support means in one direction and biasing means for moving said carrier support means in a direction opposite said one direction.

21. A cassette changer as defined in claim 14 wherein the projector includes a receiving chamber communicating with the elongated slot, and means for initiating a program of film handling operation, including cassette ejection, in response to a cassette being fully inserted in the receiving chamber by said carrier means and said changer further includes control means for coordinating the operation of said indexing means and said carrier means with the operation of the projector.

22. A film handling system comprising:
a motion picture projector including:
a projector housing having a slot therein through which a film handling cassette may be inserted into and withdrawn from said projector housing;

means including a chamber communicating with said slot for receiving and supporting a cassette at an operative position therein for film handling operations, said chamber being configured such that a cassette may be fully inserted therein by the application of a downward force on the cassette;

film handling means for performing operations including projection, processing and rewind of a film strip in a cassette located at said operative position; and ejection means for partially ejecting a cassette from said chamber through said slot after film handling operations;

in combination with a cassette changer comprising:

a changer housing having an opening therein through which a film handling cassette may be moved out of and into said changer housing;

means for releasably securing said changer housing to said projector housing and for locating said changer housing in a predetermined relationship with said projector housing such that said opening in said changer housing is aligned with said projector slot;

means within said changer housing for supporting a plurality of film handling cassettes;

indexing means mounted within said changer housing for moving and selectively presenting each of the plurality of cassettes at a position where it is aligned over said changer opening and said projector slot; and carrier means mounted within said changer housing for lowering a cassette from the aligned position through said changer opening and said projector slot into said chamber and for applying a downward force on the cassette to locate it in position for film handling operations and thereafter for returning the partially ejected cassette to said aligned position.

23. A film handling system as defined in claim 22 wherein said indexing means includes means for moving a cassette from a pre-insertion storage position located to one side of said changer opening to said aligned position for insertion into and subsequent withdrawal from said chamber, and then to a post-ejection storage position located to the opposite side of said changer opening.

24. A film handling system as defined in claim 22 wherein said projector includes means for initiating a cycle of operations in response to a cassette being located at its operative position in said chamber and said changer includes control means for coordinating the operation of said indexing and carrier means with the operation of said projector.

* * * * *